(12) United States Patent
Khajetoorians et al.

(10) Patent No.: US 12,505,337 B2
(45) Date of Patent: Dec. 23, 2025

(54) DEVICE COMPRISING AN ADAPTABLE AND ADDRESSABLE NEUROMORPHIC STRUCTURE

(71) Applicant: STICHTING KATHOLIEKE UNIVERSITEIT, Nijmegen (NL)

(72) Inventors: Alexander Ako Khajetoorians, Nijmegen (NL); Hilbert Johan Kappen, Nijmegen (NL)

(73) Assignee: STICHTING KATHOLIEKE UNIVERSITEIT, Nijmegen (NL)

( * ) Notice: Subject to any disclaimer, the term of this patent is extended or adjusted under 35 U.S.C. 154(b) by 875 days.

(21) Appl. No.: 17/782,054

(22) PCT Filed: Nov. 11, 2020

(86) PCT No.: PCT/NL2020/050712
§ 371 (c)(1),
(2) Date: Nov. 28, 2022

(87) PCT Pub. No.: WO2021/112667
PCT Pub. Date: Jun. 10, 2021

(65) Prior Publication Data
US 2024/0256844 A1    Aug. 1, 2024

(30) Foreign Application Priority Data
Dec. 2, 2019  (NL) .................................. 2024351

(51) Int. Cl.
*G06N 3/065*    (2023.01)
*G06N 3/04*    (2023.01)
*G06N 3/063*    (2023.01)

(52) U.S. Cl.
CPC ................................ *G06N 3/063* (2013.01)

(58) Field of Classification Search
CPC ........ G06N 3/063; G06N 3/044; G06N 3/047; G06N 3/065; G06N 3/08
See application file for complete search history.

(56) References Cited

U.S. PATENT DOCUMENTS

| | | | |
|---|---|---|---|
| 4,874,963 A | 10/1989 | Alspector | |
| 2019/0198617 A1* | 6/2019 | Li | H10D 12/211 |
| 2020/0257933 A1* | 8/2020 | Steingrimsson | B22F 5/04 |
| 2020/0365737 A1* | 11/2020 | de Souza | G11C 13/0009 |

OTHER PUBLICATIONS

International Search Report and Written Opinion for PCT Patent Application No. PCT/NL2020/050712 dated Feb. 26, 2021, 14 pages.

(Continued)

*Primary Examiner* — Brandon S Cole
(74) *Attorney, Agent, or Firm* — AEON Law, PLLC; Adam L.K. Philipp; Charlotte E. Holoubek

(57) ABSTRACT

The present invention is in the field of a device comprising an adaptable and addressable neuromorphic structure, a method of operating said neuromorphic structure, a method of acquiring a distribution of states of said neuromorphic structure, and a method of adapting a micro-electronic or nano-electronic device comprising said neuromorphic structure.

13 Claims, 2 Drawing Sheets

(56) References Cited

OTHER PUBLICATIONS

Kiraly et al., "An Atomic Boltzmann Machine Capable of On-Chip Learning", Arxiv.Org, Cornell University Library, 201 Olin Library Cornell University Ithaca, NY 14853, Jul. 3, 2020, 27 pages.
Kiraly et al., "An Orbitally Derived Single-Atom Magnetic Memory", Arxiv.Org, Cornell University Library, 201 Olin Library Cornell University Ithaca, NY 14853, Jul. 4, 2018, 40 pages.
Laskowski et al., "Spin-glass Implementation of a Hopfield Neural Structure", 12th European Conference on Computer Vision, ECCV 2012, Jan. 1, 2014, pp. 89-96.
Querlioz et al., "Memory-Centric Neuromorphic Computing with Nanodevices", 2019 IEEE Biomedical Circuits and Systems Conference (Biocas), IEEE, Oct. 17, 2019, pp. 1-4.

\* cited by examiner

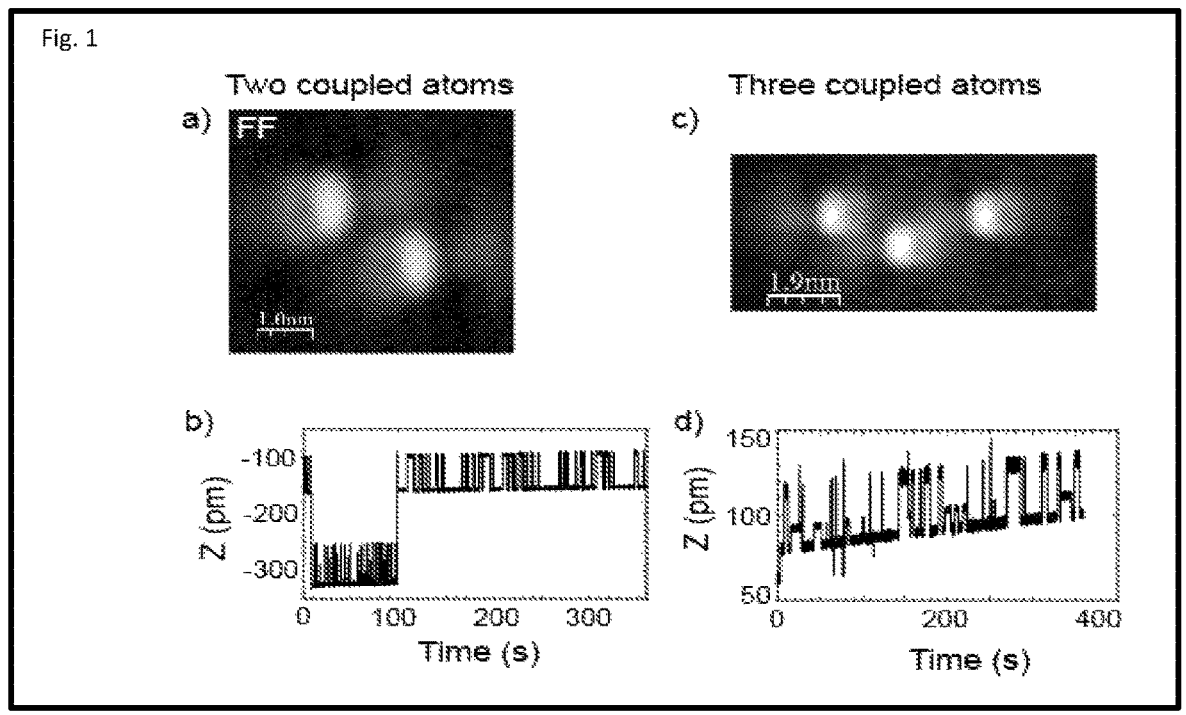
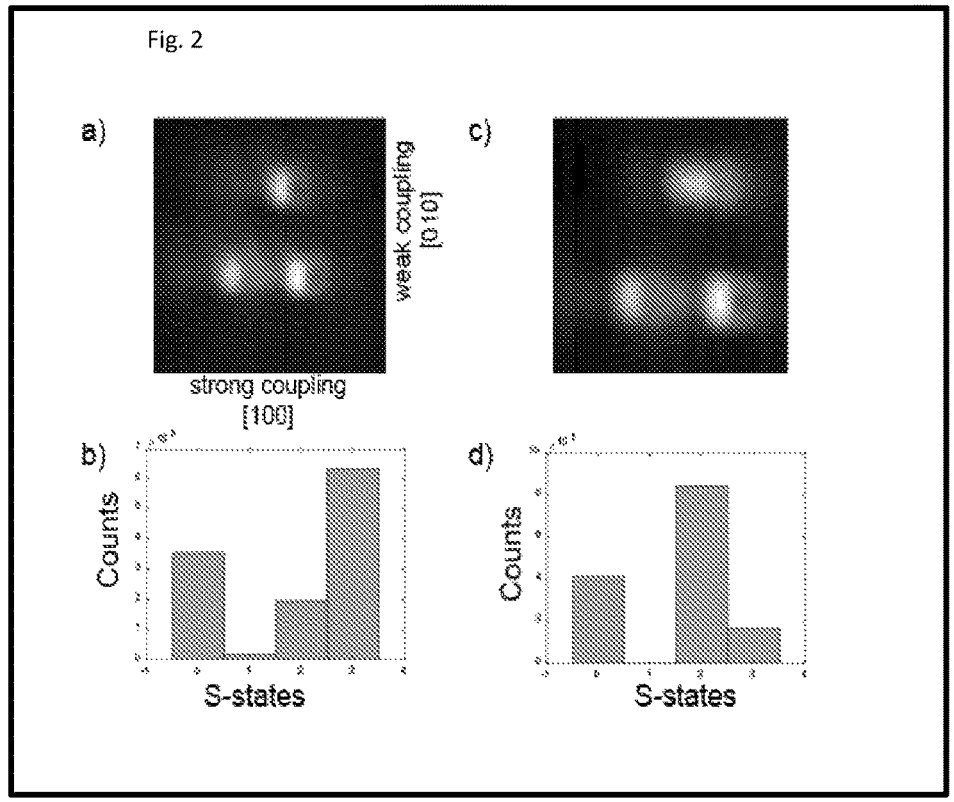

DEVICE COMPRISING AN ADAPTABLE AND ADDRESSABLE NEUROMORPHIC STRUCTURE

RELATED APPLICATIONS

This application is a U.S. National Phase of PCT Patent Application No. PCT/NL2020/050712 having International filing date of Nov. 11, 2020, which claims the benefit of priority of Netherlands Patent Application No. 2024351 filed on Dec. 2, 2019. The entire contents of the above-referenced applications and of all priority documents referenced in the Application Data Sheet filed herewith are hereby incorporated by reference for all purposes.

FIELD OF THE INVENTION

The present invention is in the field of a device comprising an adaptable and addressable neuromorphic structure, a method of operating said neuromorphic structure, a method of acquiring a distribution of states of said neuromorphic structure, and a method of adapting a micro-electronic or nano-electronic device comprising said neuromorphic structure.

BACKGROUND OF THE INVENTION

The present invention is in the field of an artificial neural network, which could be of a hardware type, of a software type, or both. These networks resemble or mimic biological neural networks such as in the human brain. It is known that a brain can learn, such as learning how to perform specific tasks or motoric activities. Artificial networks are considered capable of "learning" as well, such as in the field of pattern recognition. It is important to realize that these networks can learn even without prior knowledge of whatever is to be learned, that is gaining knowledge, or understanding, or skill, or experience, or a combination thereof.

In a neural network units are connected. In analogy to the human brain neuron units are connected by synapses. The connection allow interaction between the network units, such as by sending and receiving "signals", typically electro-chemical pulses in the brain and electromagnetic pulses in an artificial neural network. The learning aspect may be considered to relate the processing of signals, and likewise the memory of past history of processed signals, such as in a memory. In prior art computers such a signal may relate to a bit (0 or 1), and in quantum computers to a state.

Even more complex, in a mathematical representation the connections in the neural network may relate to a non-linear function, such as of the inputs. In addition weights may be attributed to network units and connections, which weights may be adjusted in a learning process. A weight may increase or decrease, depending on the input.

Artificial neural networks may have a single layer, or multiple layers. Each individual layer may perform a different function and provide a different response to inputs. Neural networks may also have recurrent connections without a layered structure.

Artificial neural networks may perform specific and typically complex tasks typical for human beings, implemented on or in a computer, such as computer vision, gaming, recognition, translation, and diagnosis.

Neuromorphic hardware are considered energy efficient solutions to implement trained neural networks on dedicated hardware. Such devices may be used as sensors, such as in cars or in telephones. The most common hardware is the memristor (see e.g. Li, Can, et al. Nature communications 9.1 (2018): 2385), which utilizes the variable resistive state, combined with hysteresis, to mimic synaptic weights. U.S. Pat. No. 4,874,963 A shows a neuron network which achieves learning by means of a modified Boltzmann algorithm. Synapses therein comprise the source-drain circuits of a plurality of paralleled FETs which differ in resistance or conductance in a binary sequence. The synapses are controlled by the output of an Up-Down counter, the reading of which is controlled by the results of a correlation of the states of the two neurons connected by the synapse pairs following the application of a set of plus and minus training signals to selected neurons of said network. A noise generator comprising a thermal noise source is provided for each neuron for the purpose of simulated annealing of the network. The current feature size of a typical cross-bar memristive network is >10 nm in size, and this is similar in size to other implementations, such as spintronic based nano-oscillators or ferroelectric memristors. Moreover, there is considerable effort in stochastic computing, with solid-state components, like nanomagnets. But at this stage, the state of the art implementations typically involves optimization problems, and have not addressed any self-learning applications.

Neuromorphic hardware nowadays mainly relies on software solutions to implement learning, or so-called off-chip algorithms. On-chip learning is considered a technically extremely difficult problem to overcome. There are no clear solid-state material systems known that can host synapses that adapt and remember physical properties of the material based on certain sets of input stimuli, while simultaneously host neurons that do fast non-linear processing. Examples exist of materials that exhibit synaptic behaviour or neurons, but not both.

Another problem in this field of technology is reducing the size of the material constituents, or so called scaling. The memristor, the standard synaptic solution in solid-state design, is on the order of 10-100 nm in feature size. A minimal neural network requires the coupling of at least a few hundreds of neurons and more often at least a few thousands of synapses, and potentially much larger numbers, making potential devices much larger than desired. Scaling technologies like memristors down in size, as well, as integrating this architecture with neurons, is a highly non-trivial step, resulting from material limitations as well as limitations in fabrication. Other architectures, such as nano-magnets, also have feature sizes that are on the order of >200 nm, still many orders of magnitude away from fundamental size limits.

Also current hardware is limited to 2D designs, which limits the connectivity between neurons.

Some initial work on an orbitally derived single-atom magnetic memory has been published in https://www.nature.com/articles/s41467-018-06337-4, 2018. Therein a single magnetic atom on a surface epitomizes the scaling limit for magnetic information storage. Individual atomic spins can exhibit magnetic remanence and be read out with spin-based methods, demonstrating the fundamental requirements for magnetic memory. However, atomic spin memory has been only realized on thin insulating surfaces to date, removing potential tunability via electronic gating or distance-dependent exchange-driven magnetic coupling. Herein, a novel mechanism for single-atom magnetic information storage based on bistability in the orbital population, or so-called valency, of an individual Co atom on semiconducting black phosphorus (BP) is shown. Distance-dependent screening from the BP surface stabilizes the two distinct valencies and enables to electronically manipulate the relative orbital population, total magnetic moment, and spatial charge density of an individual magnetic atom without a spin-dependent readout mechanism. Furthermore, the strongly anisotropic wavefunction can be used to locally tailor the switching dynamics between the two valencies. This orbital memory derives stability from the energetic barrier to atomic relaxation and demonstrates the potential for high-temperature single-atom information storage.

The present invention relates to novel approach towards a neuromorphic structure, which overcomes one or more of the above disadvantages, without jeopardizing functionality and advantages.

SUMMARY OF THE INVENTION

The present invention relates in a first aspect to device comprising an adaptable and addressable neuromorphic structure, an input part for the Neuromorphic structure, and an output part for the Neuromorphic structure. The present input and likewise output form a part of the present device, or an element thereof, hence input part and output part. Therein both neural and synaptic elements are combined in a system, such as of coupled first and/or second atoms, such as atomic dopants, that is, the first and second atoms being selected from the periodic Groups of elements different from the Groups of elements of which the atoms of the atomic surface are selected from. Coupling between atomic spins has been vastly studied in literature. However, there are no examples of multi-well behaviour emerging. The present atomic surface, or likewise surface comprising atoms, relates to a phenomenon that can nowadays in a 2D-version thereof can be observed by using e.g. an Atomic Force Microscope or a Scanning Tunnelling Microscope. The first atoms may be considered to relate to neural elements, or neurons, whereas the second atoms may be considered to relate to synaptic elements, or synapses. Therein each individual first and second atom may exhibit bi-stability, such as based on a so-called orbital memory concept. For instance, when ionized (e.g. with a gate), such orbital memory can be driven into a stochastic regime, leading to a switching behaviour which when coupled mimics stochastic neural networks. An innovative step is coupling orbital memories, such as via Coulomb interactions, which in an example, when gated, results in a complex energy landscape with multiple wells that mimic concepts like a Boltzmann machine. This switching behaviour between the wells non-trivially results from variable coupling resulting from stochastic variations in electronic screening and charge distributions within each given atom. The switching of the atoms is found to occur at two very distinct and different time scales (or time domains, $\tau_1$ and $\tau_2$). A fast time scale is identified, with neuron dynamics, and a slow time scale, with learning (synapse) dynamics. This separation of time-scales may be realized by utilizing a van der Waals material, with anisotropic charge screening behaviour. Certain patterned sets of atoms are found more strongly coupled (neurons), than others sets of atoms (synapses), depending on anisotropy, such as direction, which may be a by-product of the anisotropic material substrate surface. This enables atoms to be closely packed, but to switch at vastly different time scales (orders of magnitude). The separation of time scales in the neurons and synapses is found to lead to a new on-chip learning scheme, which the steady state distribution of the neurons depends on the synaptic configuration, and the preferential synaptic configuration can be memorized over a long time scale, e.g. depending on the input gate voltage history. On fast time scales, the network is found to relax to a distribution that is controlled by the state of the synaptic (slow) variables. On longer time scales learning takes place by the change of the states of the slow variables. It is demonstrated that this learning is controllable by external inputs, similar to the way this happens in the animal brain.

The innovation of this invention is considered multi-fold. First, it is demonstrated that a neuromorphic functionality can be realized at the level of individual atoms. It is therefore scaled to the fundamental limit, the level of single atoms, each atom having at least two states, wherein atoms are coupled and wherein use is made of coupled degrees of freedom, such as displacement and charge switching. Secondly, the present architecture integrates both neuron and synaptic behaviour in one and the same elements, considered to be based on utilized variable coupling of elements. The present device concept is capable of on-chip learning, based on the separation of timescales between the neurons and synapses, yielding a concept for the first time where learning can be done directly in the device. Finally, atomic arrays can be stacked mutatis mutandis to extend this structure to 3d designs. This unique combination is different than all present day technology: namely, atomic, neuron in combination with synapse, and on-chip learning. The advantages of on-chip learning bypass the necessity for computer algorithm based interfaces with neuromorphic hardware. Moreover, the advantages of going to the single atom level implies that this method can reach much higher densities and greater energy efficiency than currently available, especially integrated neuron and synaptic behaviour in the same unit, i.e. coupled orbital memories.

Some care may have to be taken upon implementation. In an example the atoms are on a surface of a semiconductor material. The present system is therefore best shielded from chemically active species, such as present in air. For a 3D system this is much less relevant. A first demonstration was performed at low temperature (T=4 K). This low temperature can be overcome also, by utilizing bulk dopants which exhibit similar behaviour, at higher temperature. In order to use a system with many atoms a device design can be changed, such as towards a standard top gate design. The characteristic time of learning is currently in the range of 10 ms to several minutes, whereas the neurons typically fire on the order of milli-seconds. This may be suitable for certain biologically inspired robotic applications where learning is an ongoing process. For certain engineering purposes, it would be advantages to freeze the synaptic states, once stable for much longer periods of time, while neurons fire faster. For other, more biologically inspired applications, the finite stability time of the synapses could be beneficial.

The present neuromorphic structure is adaptable and addressable. By providing a suitable stimulus, such as an electromagnetic stimulus, the neuro-morphology of the system may be adapted; such is considered to relate to an adaptation of the distribution of states, from a first to a second distribution. Thereto the neuromorphic structure is addressable by said stimulus, typically provided through an input. The stimulus typically is effective in the first time scale ($\tau_1$). The neuro-morphology of the present structure is considered to effect a change in the second time scale ($\tau_2$). Thereto at least one anisotropic configuration is provided, i.e. wherein electromagnetic properties in a first (x-) direction are different from electromagnetic properties in a second (y-) direction. The term "configuration" reflects the present arrangement of parts which provide the present adaptable and addressable neuromorphic structure. The anisotropic configuration, each individually, comprise an atomic surface with an electrical conductivity σ of <10 S/m, i.e. a relatively low semi-conducting surface, or a surface which has electrical insulating properties. In the anisotropic configuration at least n of electromagnetically addressable first atoms are provided, wherein n≥2, wherein each individual first atom has at least two addressable and adaptable states. Also in the anisotropic configuration at least m of electromagnetically addressable and adaptable second atoms are provided, wherein the first and second atoms may be different or the same. In principle also molecules, typically small molecules, could be provided in addition to, or as alternative of, first and second atoms. By using equal or similar atoms it has been found that a distribution of states is more balanced, i.e. states and distribution of states bear equal weights, whereas if molecules would be provided, such a distribution could be skewed more towards a limited or even single distribution of states; the latter could make it more difficult to adapt and address the distribution of states, and also could make it more difficult to establish a (subsequent) distribution of states, as differences between distribution of states could become smaller. As a consequence the configuration exhibits at least $2^{(n+m)}$ coupled states, $2^{(n)}$ states related to the first atoms, and $2^{(m)}$ states related to second atoms. As used throughout the description and claim the term "states" typically relates to "coupled states". The states of first atoms are addressable and adaptable in a first time scale<10 sec, and wherein states of first atoms are addressable and adaptable through states of second atoms in a second time scale>100*the first time scale, i.e. in a much slower time scale. It is noted that first atoms are coupled to second atoms, and thereby first atoms respond to a change of state of the second atoms. In order to effect an adaptation of states at least one input part for providing a stimulus for adapting at least one state of at least one second atom is provided. As mentioned above, thereby a distribution of states of the at least one anisotropic configuration is adapted from a first to a second distribution. In order to establish (i.e. measure, or sense, or observe, over a period of time) the distribution of states of the at least one configuration an output is provided, which output can e.g. be read by a suitable device, such as any output part adapted to receive an electro-magnetic signal, and likewise transmit, such as an STM.

The present device could be used as a single so-called Boltzmann machine, or parallel Boltzmann machines could be provided, such as one per topic or type of object.

The present method of operating the present device comprising a neuromorphic structure at least one state of at least one second atom is adapted by providing a stimulus, such as an electromagnetic pulse, thereby changing the at least one state of the at least one second atom, which occurs in the first time scale, the change of state adapting the coupling of states, which occurs in the second time scale, and thereby adapting the distribution of states from a first to a second distribution of states.

The present method of acquiring a distribution of states of the neuromorphic structure according to the invention provides said neuromorphic structure, and an STM, a response of said neuromorphic structure is measured, such as upon application of a voltage with said STM over a period of time, assessing individual states in said response, calculating a number of occurrences of said individual states over said period of time, and quantifying said distribution of states.

The present method of adapting a micro-electronic or nano-electronic device provides the neuromorphic structure according to the invention in said micro-electronic or nano-electronic device, and adapting the distribution of states by applying at least one stimulus to at least one second atom.

In the present method labels could be provided, such as in a case of supervised learning, wherein labels reflect a certain aspect of the present stimulus, such as a type of object.

In the present method use can be made of supervised or un-supervised learning, or a combination thereof.

The present product comprises the present device.

Thereby the present invention provides a solution to one or more of the above mentioned problems.

Advantages of the present invention are detailed throughout the description.

DETAILED DESCRIPTION OF THE INVENTION

The present invention relates in a first aspect to
An adaptable and addressable device comprising a neuromorphic structure according to claim 1.

In an exemplary embodiment of the present device comprising a neuromorphic structure states may be selected from ionic states, semi-ionic states, magnetic states, quantum states, optical states, and combinations thereof. Ionic states may be +1, −1, and 0. Optical typically relates to a wavelength of 180-3000 nm.

In an exemplary embodiment of the present device comprising a neuromorphic structure the atomic surface may be anisotropic, such as orthorhombic, hexagonal, rhombic, triclinic, monoclinic, or trigonal. Therewith the surface provides anisotropy to the configuration.

In an exemplary embodiment of the present device comprising a neuromorphic structure the atomic surface may comprise third atoms, selected from a Group of elements. The first and second atoms may each individually be selected from Groups of elements different from the Group of third atoms, such as selected from Group 3-Group 12 elements preferably 3d-transition metal elements, such as Co, Ni, Fe, and Ti.

In an exemplary embodiment the neuromorphic structure the surface may comprise at least one atom selected from Group IIIa elements, Group IVa elements, and Group Va elements, such as P, Si, and Ge, such as black phosphorous.

In an exemplary embodiment the neuromorphic structure the surface may comprise at least one atom selected from two-dimensional crystals providing interlayer van der Waals interactions in a direction perpendicular to the layer surface, preferably selected from graphene, hexagonal-BN, black phosphorus, transition metal dichalcogenides, wherein the metal is preferably selected from Mo, W, Nb, and wherein the chalcogen is preferably selected from S, Se and Te, such as $MoS_2$, $NbSe_2$, and $WSe_2$, and combinations thereof.

In an exemplary embodiment the neuromorphic structure the surface may comprise two or more layers.

In an exemplary embodiment of the present device comprising a neuromorphic structure the surface may be crystalline, or semi-crystalline.

In an exemplary embodiment of the present device comprising a neuromorphic structure atoms in the surface may be in plane or may be partly out of plane.

In an exemplary embodiment the neuromorphic structure may comprise i configurations, wherein i≥2, preferably $i \in [3-2^{20}]$, more preferably $i \in [2^2-2^{15}]$, even more preferably $i \in [2^4-2^{10}]$, such as $i \in [2^6-2^8]$.

In an exemplary embodiment of the present device comprising a neuromorphic structure n≥2, preferably $n \in [3-2^{20}]$, more preferably $n \in [2^2-2^{15}]$, even more preferably $n \in [2^4-2^{10}]$, such as $n \in [2^6-2^8]$.

In an exemplary embodiment of the present device comprising a neuromorphic structure m≥2, preferably m∈[3-$2^{20}$], more preferably m∈[$2^2$-$2^{15}$], even more preferably m∈[$2^4$-$2^{10}$], such as m∈[$2^6$-$2^8$].

In an exemplary embodiment of the present device comprising a neuromorphic structure first atoms may be provided in at least one row, and wherein second atoms may be provided in at least one adjacent row, preferably two adjacent rows.

In an exemplary embodiment of the present device comprising a neuromorphic structure rows of first atoms may interchange rows of second atoms.

In an exemplary embodiment of the present device comprising a neuromorphic structure coupling between first atoms may be strong, such as >4 meV, preferably >10 meV, such as >20 meV.

In an exemplary embodiment of the present device comprising a neuromorphic structure coupling between second atoms may be weak, such as <3 meV, preferably <1 meV, such as <0.1 meV.

In an exemplary embodiment of the present device comprising a neuromorphic structure coupling between a first atom and a second atom may be weak, such as <10 meV, preferably <4 meV, such as <0.1 meV.

In an exemplary embodiment of the present device comprising a neuromorphic structure the input part for adapting at least one state of at least one second atom may be selected from an input part for receiving a stimulus, a gate for ionizing first atoms, an electro-magnetic switch, a transistor, a diode, an optical input part, and combinations thereof.

In an exemplary embodiment of the present device comprising a neuromorphic structure the input part may be adapted to receive an electro-magnetic pulse, an optical pulse, an acoustic pulse, and combinations thereof, and likewise transmit the stimulus.

In an exemplary embodiment of the present device comprising a neuromorphic structure the first time scale may be <$10^{-2}$ sec, preferably <$10^{-3}$ sec. It is noted that the time scale inherently is larger than 0 sec, as any "action" in physics takes time.

In an exemplary embodiment of the present device comprising a neuromorphic structure the second time scale may be >$10^2$ sec, preferably >$10^3$ sec. From a practical point of view after a certain time measurements may stop, typically after some minutes, and sometimes after a few hours, depending on the characteristics of the present neuromorphic structure.

In an exemplary embodiment of the present device comprising a neuromorphic structure the second time scale may be >$10^3$*the first time scale, preferably >3*$10^3$*the first time scale, such as >$10^4$*the first time scale.

In an exemplary embodiment of the present device comprising a neuromorphic structure the surface may have an electrical conductivity σ of $10^{-6}$–5*$10^{-3}$ S/m (@ 20° C.), preferably $10^{-5}$–$10^{-3}$ S/m.

In an exemplary embodiment of the present device comprising a neuromorphic structure the distributions of states may be stable in a time scale smaller than the second time scale.

In an exemplary embodiment of the present device comprising a neuromorphic structure said configuration may be provided incorporated in a substrate.

In an exemplary embodiment the neuromorphic structure may comprise at least one electric contact per configuration, wherein said at least one electric contact optionally extends through the substrate to the configuration and to an external port.

In an exemplary embodiment of the present device comprising a neuromorphic structure the neuromorphic structure may be provided by semiconductor processing.

In an exemplary embodiment of the present device comprising a neuromorphic structure the neuromorphic structure may be addressable and adaptable by a scanning tunnelling microscope and a voltage source, In an exemplary embodiment the present methods may further comprise adapting a coupling at least once in the first time scale and/or in the second time scale.

In an exemplary embodiment of the present device comprising the neuromorphic structure is an artificial neural network for on-chip learning.

In an exemplary embodiment of the present method of adapting a device may comprise adapting a coupling at least once in the first time scale and/or in the second time scale.

In an exemplary embodiment of the present methods adapting a coupling may be repeated, such as at least two times.

In an exemplary embodiment of the present methods the structure may be operated at a pressure of <100 kPa.

In an exemplary embodiment of the present product the product is selected from a sensor, an oscillator, spintronics, a car, a telephone, a chip, a neural network, a quantum computer, and combinations thereof.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims. In addition reference is made to an article submitted for publication by A. Khajetoorians and B. Kappen, which article and its contents are incorporated by reference.

SUMMARY OF FIGURES

FIGS. 1a-d, 2a-d, and 3a-c show details of the present invention.

DETAILED DESCRIPTION OF FIGURES

Figure 3:
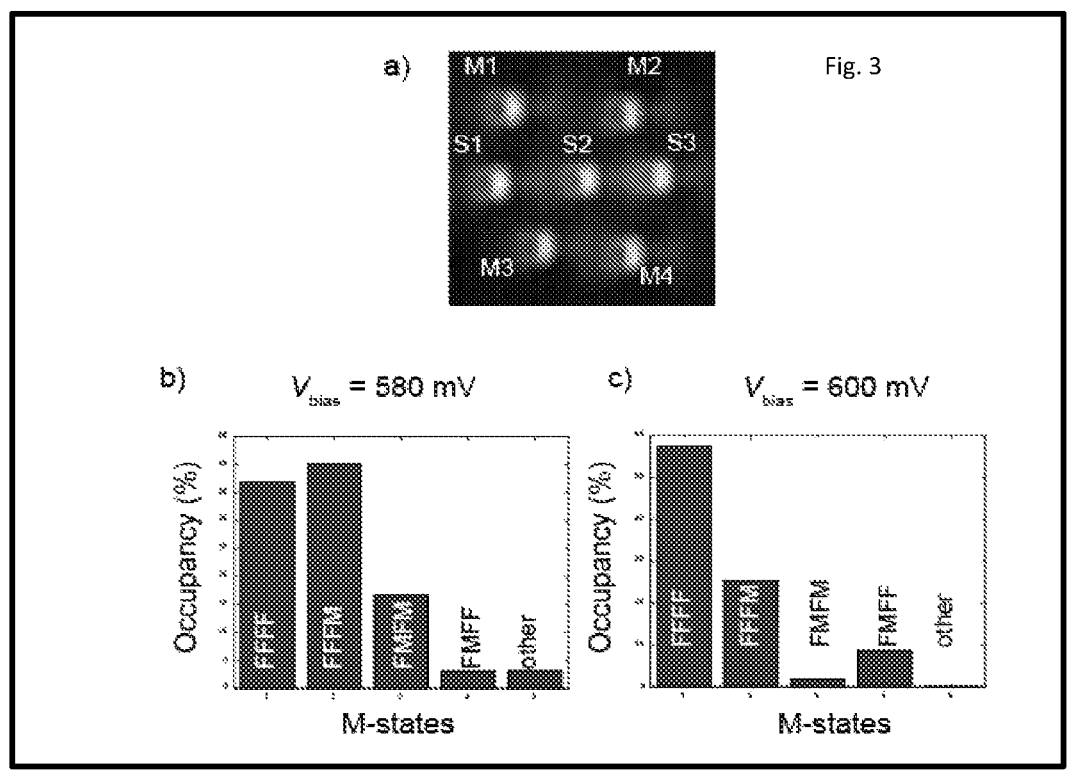

FIG. 1. Multistate noise of coupled Co atoms on black phosphorus. (a) STM image of two coupled atoms. (b) Multistate noise of configuration shown in (a), where 4 states are visible. (c) STM image of three coupled Co atoms. (d) Multistate noise of configuration shown in (c), where 6 out of the 8 possible states are visible.

FIG. 2. Anisotropic coupling of Co atoms on black phosphorus along the and directions. (a) STM image of three coupled Co atoms, where the top atom is in the fish state. (b) Histogram of the distribution of the spin states (the two lower atoms in (a)) for M=F (for fish). (c) STM image of the same three Co atoms, where the top atom is in the mushroom state. (d) Histogram of the distributions of the spin states for M=M (for mushroom).

FIG. 3. (a) STM image of a structure of 7 coupled Co atoms, where the spin states and M states are assigned as S1-S2 and M1-M4. (b) Histogram showing the distribution of M-states at 580 mV. (c) Histogram showing the distribution of M-states at 600 mV.

The figures are further detailed in the description.

EXAMPLES/EXPERIMENTS

The invention although described in detailed explanatory context may be best understood in conjunction with the accompanying examples and figures as detailed above.

A bulk crystal of black phosphorus was cleaved at room temperature, in an ultra-high vacuum chamber, with pressures in the range of $10^{-8}$ Pa ($10^{-10}$ mbar). Subsequently the sample was cooled with liquid helium, in ultra-high vacuum, to temperatures below 20 K and cobalt atoms were deposited on the clean surface. Next the sample was cooled to 4.5 K within a scanning tunnelling microscopy, and the surface was characterized. It is noted that individual uncoupled cobalt impurities show distinct features. They initially adsorb on a top site and illustrate a butterfly like feature in the STM image. Individual cobalt atoms were subsequently manipulated into a hollow site of the black phosphorus lattice, and there it can have one of two bistable states, which is referred to as orbital memory. The state was switched stochastically, by a tip-induced gate voltage of approximately 500 mV. This is evidenced at this ionization voltage by telegraph noise, i.e. two state noise, above one isolated atom. The imaging voltage could also be reduced, and the cobalt atom were freezed, into one of two states. The atoms could be discriminated, as they are found to have two different appearances, namely one referred to as fish like shape (referred to as state F), and one referred to as mushroom like shape (referred to as state M).

So, a method was developed to place individual cobalt atoms next to each other. It is noted that due to the anisotropy of the black phosphorus surface, two atoms can be placed next to each other either along the rows of the substrate or across them. This is found to lead to the anisotropic coupling, since the dielectric function of the material is different in two orthogonal directions of the surface. For two atoms placed near each that are ionized by a tip-induced gate, the emergence of multi-state noise was observed (FIG. 1a-b). The distribution and lifetime of these states is found to depend on the distance between the impurities, as well as the applied gate voltage. As a third atom was added, the multi-state noise is found to scale up (FIG. 1c-d) with the number of possible states, namely $2^N$. It is noted that not all states were observed with equal probability, as there is some state favourability. From this point on, reference to these states will be neural or spin states (S-states), which can be modelled as the neurons in a Boltzmann machine model.

When individual atoms are coupled both across, as well as along rows, an interesting trend was observed. Atoms across rows, in which the coupling is stronger, are referred to as the S-states, and the weaker coupled atoms as the M-states. When gated, it was observed that the lifetime of the M-states is orders of magnitude (typically at least 3 orders) longer than the S-states, and the distribution of S-states when stochastically driven is found to depend on the M-state configuration (i.e. if it is in a fish like or mushroom like state). In this way, the distribution of S-states and the effect of the given M-state configuration within the Boltzmann machine model was modelled, in which non-trivial values of the synaptic weights between the spin states are attributed. This demonstrates that this system can be model as a unit which features both neurons and synapses. See FIG. 2.

Depending on the input voltage, i.e. the stimulus to the device, it is found that that the M-states also show a preferential distribution. Depending on the initial configuration of M-states as well as the input voltage, the M-states are found to evolve according to the input voltage value, favouring a particular distribution over time. When the input voltage is modified by 10 s of millivolts, the M-state favour a different distribution, which is a demonstration of self-adaptability of the M-states. See FIG. 3.

Some exemplary qualifications and quantifications are given below.

TABLE 1

Markov matrices and equilibrium distribution for M = M (mushroom)

| T= | | | | |
|---|---|---|---|---|
| | 0.9949 | 0.0026 | 0.0017 | 0.0009 |
| | 0.0000 | 0.9993 | 0.0001 | 0.0006 |
| | 0.0000 | 0.0001 | 0.9989 | 0.0010 |
| | 0.0000 | 0.0005 | 0.0012 | 0.9982 |
| p_eq= | | | | |
| | 0.0007 | 0.2858 | 0.3881 | 0.3254 |
| T= | | | | |
| | 0.9974 | 0.0014 | 0.0011 | 0.0001 |
| | 0.0002 | 0.9992 | 0.0001 | 0.0005 |
| | 0.0000 | 0.0000 | 0.9990 | 0.0010 |
| | 0.0000 | 0.0008 | 0.0056 | 0.9936 |
| p_eq= | | | | |
| | 0.0111 | 0.1582 | 0.7078 | 0.1229 |

Learning

The present device may be used for learning. Two types of learning may be referred to; supervised and unsupervised learning. First supervised learning. For a given a set of images of cats and dogs with their labels ("this is a cat, that is a dog"), one can train a (supervised, feedforward) neural network to classify these images. This neural network is simply a complex function that maps images to the labels 'cat' and 'dog'. The function is parametrized and learning adjusts the parameters such that it works well on the training data set. After training, the label for any new image can be computed. Then unsupervised learning. Again given a set of images (say) but now one does not have the labels. The task is to discover that the images represent two types of objects, that one decides to call cats and dogs. This operation is referred to as clustering. Note, that if one had the labels cat and dog, the clustering would be already in the data.

A more advanced form of clustering is to learn a probability distribution over a data space, in this case the space of images. If each image is a 100*100 pixel array, this is a 10,000 dimensional space. If the pixel values are binary (black white) this space is the 10,000 dimensional hyper cube. The Boltzmann machine is a neural network that learns a probability distribution over the input (image) space. It does this by adapting its Hamiltonian in such a way that the different clusters correspond to minima of the Hamiltonian.

If after training a cat or dog is presented, the network dynamics will converge to one of these minima and thus recognize the image as either one of these abstract entities cat or dog.

In the case of the present device, the adaptive elements of the Hamiltonian may correspond to the slow variables.

At present the input to the device is a one dimensional signal, but one can vary its spectral content. If one has n frequencies, we can make $2^n$ different input signals by either including or excluding frequencies.

So for the unsupervised learning functionality of the device a point is how to read out. As explained any input will yield one of two typical statistical activities where the network oscillates in one of the two potential wells. The output would be to measure some 'statistics' of this activity that discriminates the activity in the two wells. For instance the mean activity of the first spin, or the correlation between spin 3 and 5 or whatever.

Finally, the whole unsupervised set up can be adjusted to become a supervised learning task by encoding the labels cat and dog explicitly into the input image. For instance all cats are encoded in the even frequency components and the dogs in the odd frequency components. Not too much intelligence would need to go into this choice, because then one is solving the clustering by encoding! Anyway, the even frequencies give particular hi activities and the odd frequencies give others and the BM learns two bumps (in the probability distribution, or valleys in the energy). Again, the readout would be measure some statistics that discriminate the two bumps.

The invention claimed is:

1. A device comprising
at least one adaptable and addressable neuromorphic structure electromagnetically and anisotropic configured to comprise at least one:
   atomic surface with an electrical conductivity σ of <10 S/m, on or in the atomic surface
   at least n electromagnetically adaptable and addressable first atoms, wherein n≥2, wherein each individual first atom has at least two addressable and adaptable first atom states, wherein the states are selected from ionic states, semi-ionic states, magnetic states, quantum states, optical states, and combinations thereof, wherein the first atoms are selected from the periodic table such that the first atom states are addressable and adaptable in a first time scale <10 sec, and
   at least m electromagnetically addressable and adaptable second atoms, wherein m≥2, wherein each individual second atom has at least two addressable and adaptable second atom states, wherein the states are selected from ionic states, semi-ionic states, magnetic states, quantum states, optical states, and combinations thereof, and wherein the second atoms are selected from the periodic table such that through the second atom states the atom states of first atoms are addressable and adaptable through states of second atoms in a second time scale >100 times the first time scale,
wherein first atoms and second atoms are placed to be electro-magnetically coupled with one and another resulting in the neuromorphic structure exhibiting at least $2^{(n+m)}$ coupled states,
wherein electromagnetic properties in a first direction are different from electromagnetic properties in a second direction,
at least one input part adapted for providing a stimulus to the neuromorphic structure for adapting at least one state of at least one second atom, wherein the input part is adapted to receive said stimulus in the form of one of an electro-magnetic pulse, an optical pulse, and an acoustic pulse, and provide said stimulus to the neuromorphic structure, thereby adapting a distribution of states of the neuromorphic structure from a first to a second distribution of states, and
at least one output part adapted for establishing the first or second distribution of states of the neuromorphic structure.

2. The device comprising a neuromorphic structure according to claim 1, wherein the atomic surface is anisotropic.

3. The device comprising a neuromorphic structure according to claim 1, wherein the atomic surface comprises third atoms, wherein first and second atoms are each individually different from third atoms and are selected from Groups of elements different from the Group of third atoms.

4. The device comprising a neuromorphic structure according to claim 1,
   wherein the atoms in the atomic surface comprises atoms of at least one element selected from Group IIIa elements, Group IVa elements, and Group Va elements, and
   wherein the atomic surface is selected from two-dimensional crystals providing interlayer van der Waals interactions in a direction perpendicular to the layer surface, wherein two-dimensional crystals are selected from graphene, hexagonal-BN, black phosphorus, transition metal dichalcogenides, and
   wherein the atomic surface comprises two or more layers, and
   wherein the atomic surface is selected from a crystalline surface, and a semi-crystalline surface, and
   wherein atoms in the atomic surface are in plane.

5. The device comprising a neuromorphic structure according to claim 1,
   wherein n≥2, and
   wherein m≥2, and
   wherein first atoms are provided in at least one row, and wherein second atoms are provided in at least one adjacent row, and
   wherein rows of first atoms interchange rows of second atoms, and
   wherein coupling between first atoms is >4 meV, and
   wherein coupling between second atoms is <3 meV, and
   wherein coupling between a first atom and a second atom is <10 meV.

6. The device comprising a neuromorphic structure according to claim 1,
   wherein the at least one input part for adapting at least one state of at least one second atom is selected from an input part for receiving the stimulus, a gate for ionizing second atoms, an electro-magnetic switch, a transistor, a diode, and an optical input part, and
   wherein at least one output part adapted for establishing the first or second distribution of states of the neuromorphic structure is selected from output parts adapted to receive an electro-magnetic signal.

7. The device comprising a neuromorphic structure according to claim 1,
   wherein the first time scale is $<10^2$ sec, and
   wherein the second time scale is $>10^2$ sec, and
   wherein the second time scale is $>10^3$*the first time scale, and
   wherein the surface has an electrical conductivity σ of $10^{-6}$-$5*10^{-3}$ S/m (@ 20° C.).

8. A method of operating a device comprising a neuromorphic structure in a device comprising
at least one adaptable and addressable neuromorphic structure electromagnetically and anisotropic configured to comprise at least one:
   atomic surface with an electrical conductivity σ of <10 S/m, on or in the atomic surface
   at least n electromagnetically adaptable and addressable first atoms, wherein n≥2, wherein each individual first atom has at least two addressable and adaptable first atom states, wherein the states are selected from ionic states, semi-ionic states, magnetic states, quantum states, optical states, and combinations thereof, wherein the first atoms are selected from the periodic table such that the first atom states are addressable and adaptable in a first time scale <10 sec, and at least m electromagnetically addressable and adaptable second atoms, wherein m≥2, wherein each individual second atom has at least two addressable and adaptable second atom states, wherein the states are selected from ionic states, semi-ionic states, magnetic states, quantum states, optical states, and combinations thereof, and wherein the second atoms are selected from the periodic table such that through the second atom states the atom states of first atoms are addressable and adaptable through states of second atoms in a second time scale >100 times the first time scale, wherein first atoms and second atoms are placed to be electro-magnetically coupled with one and another resulting exhibiting at least $2^{(n+m)}$ coupled states, wherein electromagnetic properties in a first direction are different from electromagnetic properties in a second direction, at least one input part adapted for providing a stimulus to the neuromorphic structure for adapting at least one state of at least one second atom, wherein the input part is adapted to receive said stimulus in the form of one of an electro-magnetic pulse, an optical pulse, and an acoustic pulse, and provide said stimulus to the neuromorphic structure, thereby adapting a distribution of states of the neuromorphic structure from a first to a second distribution of states, and at least one output part adapted for establishing the first or second distribution of states of the neuromorphic structure, the method comprising adapting at least one state of at least one second atom by providing a stimulus to the device, selecting the stimulus from an electro-magnetic pulse, an optical pulse, and an acoustic pulse, changing the at least one state of the at least one second atom in the second time scale thereby, the change of state adapting the coupling of states in the first time scale, and adapting the distribution of states from a first to a second distribution of states thereby.

9. A method of acquiring a distribution of states of a neuromorphic structure in a device comprising at least one adaptable and addressable neuromorphic structure electromagnetically and anisotropic configured to comprise at least one:

atomic surface with an electrical conductivity σ of <10 S/m, on or in the atomic surface at least n electromagnetically adaptable and addressable first atoms, wherein n≥2, wherein each individual first atom has at least two addressable and adaptable first atom states, wherein the states are selected from ionic states, semi-ionic states, magnetic states, quantum states, optical states, and combinations thereof, wherein the first atoms are selected from the periodic table such that the first atom states are addressable and adaptable in a first time scale <10 sec, and at least m electromagnetically addressable and adaptable second atoms, wherein m≥2, wherein each individual second atom has at least two addressable and adaptable second atom states, wherein the states are selected from ionic states, semi-ionic states, magnetic states, quantum states, optical states, and combinations thereof, and wherein the second atoms are selected from the periodic table such that through the second atom states the atom states of first atoms are addressable and adaptable through states of second atoms in a second time scale >100 times the first time scale, wherein first atoms and second atoms are placed to be electro-magnetically coupled with one and another resulting exhibiting at least $2^{(n+m)}$ coupled states, wherein electromagnetic properties in a first direction are different from electromagnetic properties in a second direction, at least one input part adapted for providing a stimulus to the neuromorphic structure for adapting at least one state of at least one second atom, wherein the input part is adapted to receive said stimulus in the form of one of an electro-magnetic pulse, an optical pulse, and an acoustic pulse, and provide said stimulus to the neuromorphic structure, thereby adapting a distribution of states of the neuromorphic structure from a first to a second distribution of states, and at least one output part adapted for establishing the first or second distribution of states of the neuromorphic structure, the method comprising providing said neuromorphic structure, providing an STM, measuring a response of said neuromorphic structure, with said STM over a period of time, assessing individual states in said response, calculating a number of occurrences of said individual states over said period of time, and quantifying said distribution of states.

10. The method of operating a device comprising a neuromorphic structure according to claim 8, wherein the device is selected from a micro-electronic device and a nano-electronic device, comprising providing the neuromorphic structure in said micro-electronic or nano-electronic device, and adapting the distribution of states by applying at least one stimulus to at least one second atom, wherein the stimulus is selected from an electro-magnetic pulse, an optical pulse, an acoustic pulse, and combinations thereof.

11. The method of operating a device comprising a neuromorphic structure according to claim 10, further comprising adapting a distribution of states of the neuromorphic structure from a first to a second distribution by adapting an electro-magnetic coupling of first and second atoms at least once in the first time scale and in the second time scale.

12. The method of operating a device comprising a neuromorphic structure according to claim 11, wherein adapting a coupling is repeated.

13. The method according to claim 9, wherein the neuromorphic structure is operated at a pressure of <100 kPa.

* * * * *